United States Patent [19]

Bertram et al.

[11] Patent Number: 4,725,652

[45] Date of Patent: Feb. 16, 1988

[54] LATENT CATALYSTS FOR EPOXY REACTIONS

[75] Inventors: James L. Bertram, Lake Jackson; Louis L. Walker, Clute; Van I. W. Stuart, Missouri City, all of Tex.

[73] Assignee: The Dow Chemical Company, Midland, Mich.

[21] Appl. No.: 21,837

[22] Filed: Mar. 4, 1987

Related U.S. Application Data

[63] Continuation-in-part of Ser. No. 849,087, Apr. 7, 1986, abandoned, which is a continuation-in-part of Ser. No. 716,279, Mar. 25, 1985, Pat. No. 4,594,291, which is a continuation-in-part of Ser. No. 631,676, Jul. 17, 1984, abandoned.

[51] Int. Cl.$^4$ .................................... C08G 59/02
[52] U.S. Cl. .................................... 525/485; 252/182; 525/486; 528/89; 528/90; 528/91; 528/92; 528/93; 528/408; 528/409
[58] Field of Search .................. 528/89, 90, 91, 92, 528/93, 408, 409; 522/31; 252/182; 525/485, 486

[56] References Cited

U.S. PATENT DOCUMENTS

| | | | |
|---|---|---|---|
| 3,477,990 | 11/1969 | Dante et al. | 260/47 |
| 3,547,881 | 12/1970 | Mueller et al. | 260/47 |
| 3,948,855 | 4/1976 | Perry | 260/47 EP |
| 4,069,055 | 1/1978 | Crivello | 522/31 X |
| 4,136,102 | 1/1979 | Crivello | 522/31 X |
| 4,150,988 | 4/1979 | Crivello | 522/31 X |
| 4,154,872 | 5/1979 | Tsao et al. | 522/31 X |
| 4,173,476 | 11/1979 | Smith et al. | 522/31 X |
| 4,175,972 | 11/1979 | Crivello | 522/31 X |
| 4,273,668 | 6/1981 | Crivello | 522/31 X |
| 4,318,766 | 3/1982 | Smith | 522/31 X |
| 4,358,578 | 11/1982 | Brownscombe | 528/91 |
| 4,366,295 | 12/1982 | Tyler, Jr. et al. | 525/482 |
| 4,438,254 | 3/1984 | Doorakian et al. | 528/104 X |
| 4,496,709 | 1/1985 | Doorakian et al. | 528/89 |
| 4,544,732 | 10/1985 | Corley | 528/88 X |
| 4,554,342 | 11/1985 | Corley | 528/90 |
| 4,581,436 | 4/1986 | Corley | 528/88 X |

FOREIGN PATENT DOCUMENTS

| | | |
|---|---|---|
| 858648 | 12/1970 | Canada . |
| 893191 | 2/1972 | Canada . |
| 58-138729 | 8/1983 | Japan . |

OTHER PUBLICATIONS

McBride et al., "Arylation of Dialkyl Sulfides", J. Org. Chem., 49, 1824–1825 (1984).

*Primary Examiner*—Earl Nielsen

[57] ABSTRACT

Latent catalysts for epoxy reactions are prepared by reacting a tetrasubstituted onium compound such as tetrabutylphosphonium acetate.acetic acid complex or an amine compound with an acid having a weak-nucleophilic anion such as fluoboric acid. These catalysts provide stable latent catalysts for epoxy resins for advancement or curing reactions.

96 Claims, No Drawings

LATENT CATALYSTS FOR EPOXY REACTIONS

CROSS REFERENCE TO RELATED APPLICATIONS

This application is a continuation-in-part of application Ser. No. 849,087 filed Apr. 7, 1986, and now abandoned, which is a continuation-in-part of application Ser. No. 716,279 filed Mar. 25, 1985, now U.S. Pat. No. 4,594,291, which is a continuation-in-part of application Ser. No. 631,676, filed July 17, 1984, now abandoned.

BACKGROUND OF THE INVENTION

The present inention concerns epoxy resins containing latent catalysts for reacting epoxy resins with polyhydric phenols.

It is desirable to have epoxy resin compositions which contain catalysts which will not become active until heated so as to improve storage life. Tyler, Jr. et al in U.S. Pat. No. 4,366,295, Perry in U.S. Pat. No. 3,948,855 and Dante in U.S. Pat. No. 3,477,990 disclsoe precatalyzed epoxy resin compositions which contain onium compounds as the catalyst. While the epoxy resin compositions containing these catalysts are relatively storage stable, it would be desirable for the precatalyzed epoxy resin composition to be even more stable.

It has now been discovered that when an onium compound or amine compound has been contacted with an acid having a weak-neucleophilic anion that the storage stbility of precatalyzed epoxy resins is improved.

SUMMARY OF THE INVENTION

The present invention pertains to a composition which when stored at a temperature of 52° C. for a period of nine weeks exhibits an inrease in viscosity measured in centipoise of not greater than about 22, preferably not greater than about 18, percent a scompared to the viscosity of the composition prior to storing and wherein the viscoisty measurements are taken at room temperature and which composition comprises a material that has an average of more than one vicinal epoxy group per molecule and a catalytic quantity of at least one latent catalyst which results from contacting (1) (a) an onium compound represented by the following formula I.

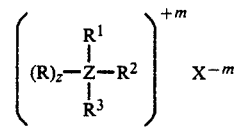

wherein each R, $R^1$, $R^2$ and $R^3$ is independently an aliphatic hydrocarbyl group having from 1 to about 20, preferably from about 1 to about 9, carbon atoms, or an aliphatic group having from 1 to about 20, preferably from 1 to about 9 carbon atoms which group also contains one or more oxygen, sulfur, halogen, or nitrogen atoms; z has a value of zero or 1 depending on the valence of Z; Z is phosphorus, nitrogen, sulfur or arsenic and each X is the anion portion of an acid of an element selected from carbon or a halogen and m has a value equal to the valence of the anion X or (b) an aliphatic or aromatic amine with (2) an acid having a weak-nucleophilic anion selected from the group consisting of fluoboric acid, fluoarsenic acid, fluoantimonic acid, fluophosphric acid, chloroboric acid, chloroarsenic acid, chloro-antimonic acid, chloro-phosphoric acid, perchloric acid, chloric acid, bromic acid, iodic acid and combinations thereof in an amount which provides from about 0.9 to about 1.5, preferably from about 1 to about 1.4 moles of weaknucleophilic anion X per mole of onium or amine compound.

The term hydrocarbyl as employed herein refers to a monovalent aliphatic hydrocarbon group such as alkyl, cycloaklyl, alkenyl and similar hydrocarbon groups.

The term weak-nucleophilic as employed herein means that the material has a nucleophilicity value "n" of greater than about zero and less than about 2.5 as described by C. G. Swain and C. B. Scott in J. Am. Chem. Soc., Vol. 75, p. 141 (1953) which is incorporated herein by reference.

DETEILED DESCRIPTION OF THE INVENTION

The catalysts of the present invention are prepared by simply mixing the onium compound or the amine compound with the acid having a weak-nucleophilic anion in the desired proportions and stirring to insure intimate contact. The contact can be conducted at temperatures of from about 0° C. to about 100° C., preferably from about 20° C. to about 60° C. for a time sufficient to complete any reaction which occurs. The time depends upon the temperature, but usually from about 1 to about 120, preferably from about 5 to about 60 minutes is sufficient. Other methods for preparing the catalyst of the present invention is to employ an insitu method wherein the onium compound or the amine compund and the acid containing a weak-nucleophilic anion are added separately to the resin formulation or component parts thereof thereby forming the catalyst insitu.

Particularly suitable onium or amine compounds or complexes which can be reacted or complexed with the acids having a weak-nucleophilic anion to form the catalysts of the present invention include, for example, tetrabutylphosphonium acetate.acetic acid complex, tetrabutylphosphonium hydroxide, tetrabutylammonium hydroxide, tetraethylammonium hydroxide, tetramethylammonium hydroxide, N-methylmorpholine, 2-methylimidazole, triethylamine, N,N,N',N'-tetramethylethylenediamine, ethyltri(2-hydroxyethyl)ammonium hydroxide, ethyltri(2-ethoxyethyl)ammonium hydroxide, triethyl(2-thioethylethyl)ammonium hydroxide, mixtures thereof and the like.

The resultant catalyst is believed to be a material represented by the aforementioned formula I wherein X is fluoborate, fluoarsenate, fluoantimonate, fluophosphate, chloroborate, chloroarsenate, chloroantimonate, chlorophosphate, and the like. Suitable epoxy resins with which the catalysts of the present invention can be mixed include, for example, those represented by the following formulas II-V

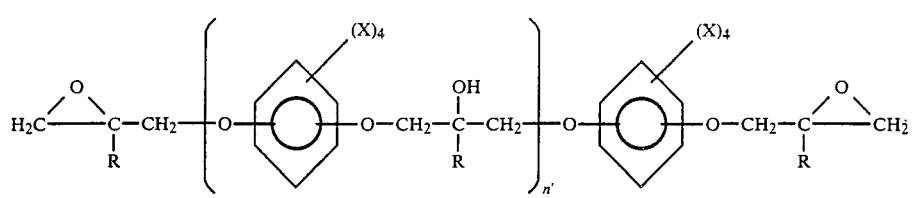

II.

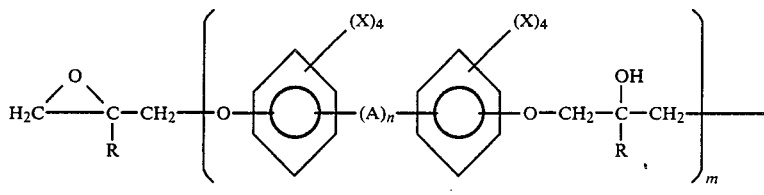

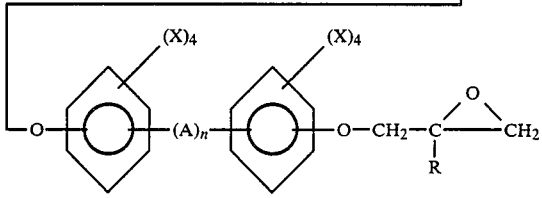

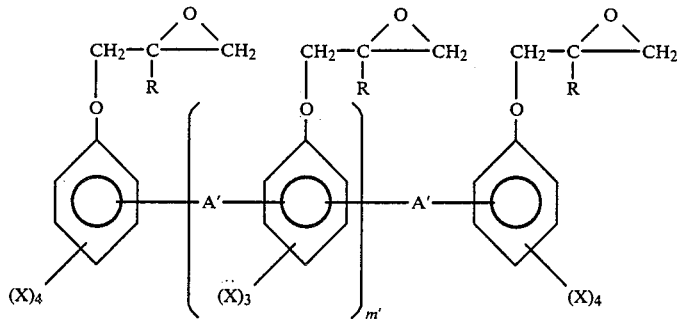

IV.

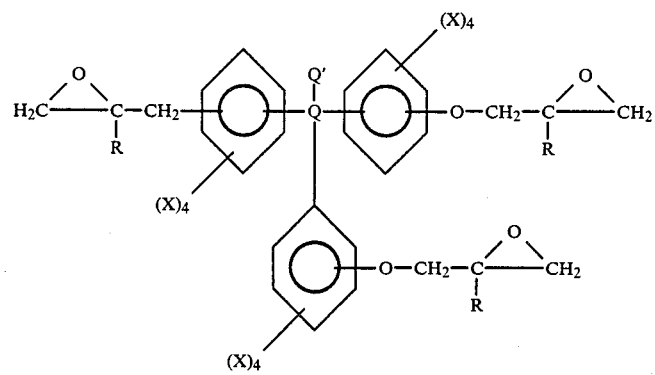

V.

wherein each A is independently a divalent hydrocarbyl group having from 1 to about 9, preferably from 1 to about 4, carbon atoms, —O—, —S—, —S—S, —SO—, SO₂—, or —CO—; each A' is independently a divalent hydrocarbyl group having from 1 to about 9, preferably from 1 to about 4 carbon atoms; Q is hydrogen or a hydrocarbyl group having from 1 to about 10 carbon atoms; Q' is hydrogen or an alkyl group having from 1 to about 4 carbn atoms; each R is independently hydrogen or an alkyl group having from 1 to about 4 carbon atoms; each X is independently hydrogen, bromine, chlorine, or a hydrocarbyl group having from 1 to about 9, preferably from 1 to about 4 carbon atoms; m has an average value from zero to about 12, preferably from about 0.2 to about 9, most preferably from about 1 to about 6; m' has a value from about 0.01 to about 10, preferably from about 0.2 to about 8, more preferably from about 0.5 to about 6; n has a value of zero or 1; and n' has an average value of from zero to about 10, preferably from zero to about 5, most preferably from about 0.1 to about 3.

Particularly suitable such epoxy resins include, for example, the diglycidyl ethers of resorcinol, catechol, hydroquinone, biphenol, bisphenol A, tetrabromobisphenol A, phenol-aldehyde novolac resins, alkylsubstituted phenol-aldehyde resins, bisphenol K, tetramethylbiphenol, tetramethyltetrabromobiphenol, tetramethyltribromobiphenol, tetrachlorobisphenol A, combinations thereof and the like.

Also suitable as the epoxy resin to which the catalysts of the present invention can be mixed include those partially advanced epoxy resins of allowed copending application Ser. No. 716,279, filed Mar. 25, 1985 by Bertram et al which is incorporated herein by reference.

Suitable aromatic hydroxyl containing materials which can be employed herein include, for example, those represented by the following formulas VI-IX

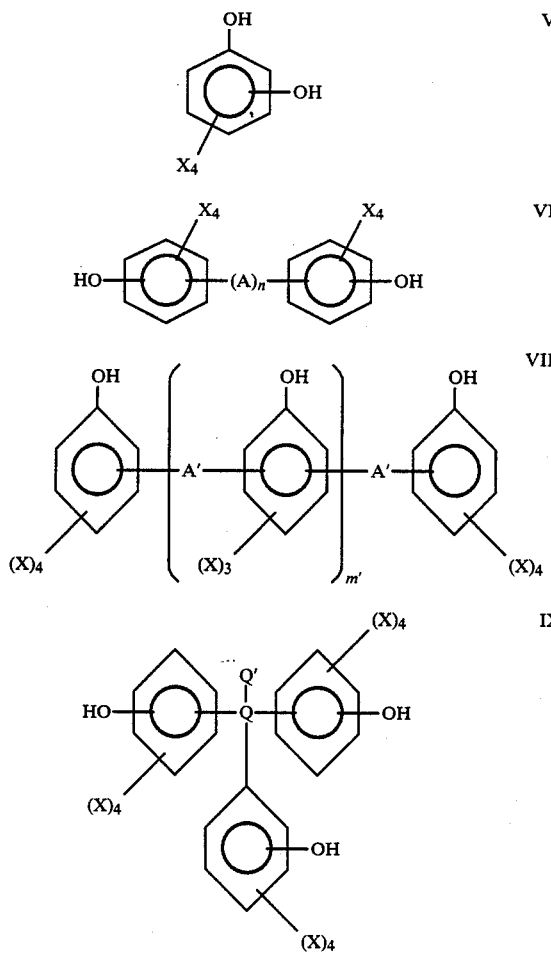

wherein A, A', Q, Q' X, n and m are as defined above in formulas II-V. Particularly suitable aromatic hydroxyl-containing materials include, for example, biphenol, bisphenol A, bisphenol K, tetrabromobisphenol A, tetrabromobisphenol K, resorcinol, phenol-aldehyde novolac resins, cresol-aldehyde novolac resins, tetramethylbiphenol, tetramethyltribromobiphenol, tetramethyltetrabromobiphenol, tetrachorobisphenol A, combinations thereof and the like.

These and other suitable aromatic hydroxylcontaining materials are disclosed in U.S. Pat. No. 4,594,291 issued June 10, 1986 by Bertram et al which is incorporated herein by reference.

The precatalyzed compositions of the present invention can contain, if desired, pigments, fillers, dyes, diluents, solvents, stabilizers, epoxy resin curing agents, combinations thereof and the like.

Suitable stabilizer materials and curing agents which can be employed herein include, for example, those disclosed in the aforementioned U.S. Pat. No. 4,594,291 by Bertram et al which is incorporated herein by reference.

The following examples are illustrative of the invention but are not to be construed as to limiting the scope thereof in any manner.

EPOXY RESIN A was a diglycidyl ether of bisphenol A having an epoxide equivalent weight of 180.8.

EXTENDER COMPOUND A was tetrabromobisphenol A having a phenolic hydroxyl equivalent weight (PHEW) of 272.

CURING AGENT A was sulfanilamide having an active hydrogen equivalent weight of about 43.

CURING AGENT B was 4,4'-diaminodiphenylsulfone having an amine hydrogen equivalent weight of about 62.

STABILIZER A was methyl-p-toluene sulfonate.

STABILIZER B was p-toluene sulfonic acid.-monohydrate.

EXAMPLES 1–21 AND COMPARATIVE EXPERIMENTS A–Z CATALYST PREPARATION

The catalysts employed in the present invention were prepared by the following general procedure. To a methanol solution of the onium or amine compound was added a 60 percent aqueous solution of fluoboric acid. A sufficient quantity of methanol was added such that the resultant product contained 40 percent of the onium or amine compound by weight. Stirring was continued until the reaction was essentially complete. The quantities and reaction conditions are given in the following Table I.

TABLE I

| CATALYST NUMBER | TYPE OF ONIUM OR AMINE COMPOUND | AMOUNT GRAMS/ MOLES | AMOUNT OF FLUOBORIC ACID GRAMS/ MOLES |
|---|---|---|---|
| 1* | 70 wt. % ethyltriphenylphonium acetate.acetic acid complex in methanol | 58.6/0.1 | 17.56/0.12 |
| 2 | 70 wt. % tetrabutylphosphonium acetate.acetic acid complex in methanol | 54/0.1 | 17.56/0.12 |
| 3 | triethylamine | 101/1.0 | 201.2/1.1 |
| 4 | N—methylmorpholine | 10.1/0.1 | 17.56/1.1 |
| 5 | N,N,N',N'—tetramethyl ethylene diamine | 58.0/0.1 | 201.2/1.1 |

*Comparative catalyst.

COMPARATIVE CATALYSTS

For comparative purposes, the following catalysts were utilized.

Catalyst A was ethyltriphenylphosphonium acetate.acetic acid complex.

Catalyst B was tetrabutylphosphonium acetate.acetic acid complex.

Catalyst C was ethyltriphenylphosphonium acetate.acetic acid complex plus an equimolar amound of phosphoric acid as described by tyler, Jr. in U.S. Pat. No. 4,366,295.

Catalyst D was tetrabutylphosphnium acetate.acetic acid complex plus an equimolar amount of phosphoric acid as described by Tyler, Jr. in U.S. Pat. No. 4,366,295.

Catalyst E was 2-methylimidazole.

Catalyst F was benzyl dimethyl amine.

Catalyst G was ethyltriphenylphosphonium iodide, 30 percent active.

Precatalyzed Epoxy Resin Formulation A

Precatalyzed epoxy resins were prepared by adding to 120 grams (0.638 equiv.) of a diglycidyl ether of bisphenol A having an epoxide equivalent weight of 188 (commercially available from The Dow Chemical Company as D.E.R. ™ 331 epoxy resin) 0.45 milliequivalent of catalyst and stirring. The precatalyzed resins were placed in a vacuum oven under a full vacuum (approximately 0.1 mm Hg) controlled at 50° C. to 55° C. for one hour (3600 s). The samples were then stored in a convection oven controlled at 52° C. and the viscosity of the samples were measured at periodic intervals. The samples were allowed to cool for 4 hours (14400 s) at room temperature before measuring the viscosity. The results are given in the following Table II.

TABLE II

VISCOSITY OF PRECATALYZED EPOXY RESIN SOLUTIONS

| Example or COMP. EXPT. NO. | CATALYST | INITIAL centipoise (Pa · s) | 1 WEEK (604800 s) centipoise (Pa · s) | 2 WEEKS (1209600 s) centipoise (Pa · s) | 4 WEEKS (2149200 s) centipoise (Pa · s) | 9 WEEKS (5443200 s) centipoise (Pa · s) |
|---|---|---|---|---|---|---|
| 1* | 1 | 12500 (12.5) | 11768 (11.768) | 11538 (11.538) | 14504 (14.504) | 15007 (15.007) |
| 2 | 2 | 12500 (12.5) | 12544 (12.544) | 12397 (12.397) | 13564 (13.564) | 14732 (14.732) |
| 3 | 3 | 12500 (12.5) | 12819 (12.819) | 12225 (12.225) | 13599 (13.599) | 14732 (14.732) |
| 4 | 4 | 12500 (12.5) | 13736 (13.736) | 12809 (12.809) | 14731 (14.731) | 15247 (15.247) |
| A* | No Catalyst | 12500 (12.5) | 12500 (12.5) | 12362 (12.362) | 14491 (14.491) | 15590 (15.59) |
| B* | A | 12500 (12.5) | 20020 (20.02) | 28502 (28.502) | 70603 (70.603) | 198485 (198.485) |
| C* | C | 12500 (12.5) | 12397 (12.397) | 12843 (12.843) | 14216 (14.216) | 19059 (19.059) |
| D* | D | 12500 (12.5) | 12225 (12.225) | 12156 (12.156) | 13323 (13.323) | 15075 (15.075) |

*Not an example of this invention as presently claimed.

Resin Advancement A

A portion of each of the precatalyzed resins from Table II, after aging for 9 weeks (5,443,200 s) at 52° C., were mixed with 22.5 weight percent bisphenol A at 160° C. until all of the bisphenol A had dissolved. The homogeneous solutions were then held at 160° C. for two additional hours, then cooled and the resultant advanced resins analyzed for percent oxirane (epoxide) content and melt viscosity measured at 150° C. The results are given in Table III.

TABLE III

ADVANCED RESIN ANALYSIS

| EXAMPLE OR COMP. EXPT. | RESIN FROM EXAMPLE OR COMP. EXPT. | PERCENT EPOXIDE** | MELT VISCOSITY CENTIPOISE (Pa · s) |
|---|---|---|---|
| 5* | 1 | 8.59 | 570 (0.57) |
| 6 | 2 | 8.66 | 550 (0.55) |
| 7 | 3 | 9.04 | 450 (0.45) |
| 8 | 4 | 9.66 | 260 (0.26) |
| E* | A*** | 8.9 | — |
| F* | B | 7.35 | 2760 (2.76) |
| G* | C | 8.44 | 680 (0.68) |
| H* | D | 8.70 | 520 (0.52) |

*Not an example of this invention as presently claimed.
**The theoretical percent epoxide is 9.0.
***Since this resin solution did not contain any advancement catalyst, 0.45 milliequiv. of catalyst A was employed.

Resin Advancement B

The procedure of Resin Advancement A was followed using 33.48 weight percent of bisphenol A instead of 22.5 weight percent. A resin/bisphenol A blends were held for 4 hours (14400 s) at 160° C. and then analyzed for oxirane content and melt viscosity measured at 200° C. The result are given in Table IV.

TABLE IV

ADVANCED EPOXY RESIN ANALYSIS

| EXAMPLE OR COMP. EXPT. | RESIN FROM EXAMPLE OR COMP. EXPT. | PERCENT EPOXIDE** | MELT VISCOSITY CENTIPOISE (Pa · s) |
|---|---|---|---|
| 9* | 1 | 1.82 | 26950 (26.95) |
| 10 | 2 | 1.85 | 30180 (30.18) |
| 11 | 3 | 3.1 | 890 (0.89) |
| 12 | 4 | 4.28 | 510 (0.51) |
| I* | A | 2.24 | 7940 (7.94) |
| J* | B | gelled | gelled |
| K* | C | 1.92 | 11470 (11.47) |
| L* | D | 2.10 | 7160 (7.16) |

*Not an example of this invention as presently claimed.
**The theoretical percent epoxide is 2.38.

Precatalyzed Resin Formulation B

To 181 grams (1 equiv.) of the diglycidyl ether of bisphenol A having an epoxide equivalent weight of 181 (commercially available from The Dow Chemical Company as D.E.R. ™ 383 epoxy resin) as added 136 grams (0.5 equiv.) of tetrabromobisphenol A and an indicated amount of catalyst. In two of the examples or comparative experimetns 1 or 1.125 milliequiv. of methyl toluene sulfonate (MTS) was added as indicated.

The mixture as stirred at 130° C. until the tetrabromobisphenol A was dissolved, then cooled to 80° C. and the indicated catalyst was added. The homogeneous resin was then stored at 52° C. and the viscosity measured at 100° C. was measured periodically. The result are given in Table V.

TABLE V

| EXAMPLE OR COMP. EXPT. | CATALYST TYPE | RESIN VISCOSITY CATALYST milliequiv. | MTS milliequiv. | MELT VISCOSITY AFTER 12 DAYS (1036800 s) cps (Pa · s) |
|---|---|---|---|---|
| 13* | 2 | 1 | 0 | 90 (0.09) |
| 14 | 2 | 2 | 1 | 90 (0.09) |
| 15 | 2 | 2 | 1.25 | 110 (0. |
| 16 | 5 | 1 | 0 | 90 (0.09) |
| M* | none | — | 0 | 150 (0.15) |
| N* | none | — | 1 | 95 (0.095) |
| O* | A | 0.125 | 1.125 | 1240 (1.24) |

*Not an example of the present invention as presently claimed.

Precatalyzed Resin Formulation C

The procedure of precatalyzed resin formulation B was employed except that 0.125 millequiv. of sulfanilamide was added along with the tetrabromobisphenol A, and the mixture was stirred and heated to 150° C. until homogeneous, then cooled to 80° C. and the following amounts of catalyst as indicated was added. The homogeneous resin was then stored at 52° C. and the viscosity measured at 100° C. was measured periodically. The results are given in Table VI.

TABLE VI

| EXAMPLE OR COMP. EXPT. | CATALYST TYPE | RESIN VISCOSITY CATALYST milliequiv | SULFANILAMIDE milliequiv | MELT VISCOSITY AFTER 12 DAYS (1036800 s) cps (Pa · s) |
|---|---|---|---|---|
| 17 | 2 | 1 | 0.125 | 450 (0.45) |
| 18 | 5 | 1 | 0.125 | 220 (0.22) |
| P* | none | — | 0.125 | 590 (0.59) |

*Not an example of the present invention.

Precatalyzed Resin Formulation D

To 45.3 grams (0.25 equiv) of D.E.R. ™ 383 epoxy resin as described above, 34 grams (0.125 equiv.) of tetrabromobisphenol A and 5.37 grams (0.125 equiv.) of sulfanilamide were added 1 milliequiv. of the indicated catalyst. A small amount of the resin mixture was then analyzed by a DuPont model 1090 Differential Scanning Calorimeter (DSC) at a rate of 2° C. per minute (0.033° C./s). The temperature at which an exothermic reaction was indicated via baseline drift, the actual onset of a major exotherm, and the exotherm peak were noted. The results are given in Table VII.

TABLE VII

| EXAMPLE OR COMP. EXPT. | CATALYST TYPE | DSC DATA BEGINNING OF EXOTHERM °C. | ONSET OF MAJOR EXOTHERM °C. | PEAK EXOTHERM °C. |
|---|---|---|---|---|
| 19 | 2 | 80-85 | 145 | 192 |
| Q* | B | 65 | 70 | 148 |
| R* | none | 80-85 | 80-85 | 222 |

*Not an example of the present invention.

Recatalyzed Resin Formulation E

The Resin Formulations D were duplicated. The formulations were stored at 80° C. and the viscosity at 100° C. was measured periodically. The results are given in the following Table VIII.

TABLE VIII

| EXAMPLE OR COMP. EXPT. | CATALYST TYPE | FORMULATED VISCOSITY STABILITY INITIAL VISCOSITY cps (Pa · s) | VISCOSITY AFTER 12 hrs. (43200 s) cps (Pa · s) | 36 hrs. (129600 s) cps (P · s) |
|---|---|---|---|---|
| 20 | 2 | 287 (0.287) | 3594 (3.594) | 154140 (154.14) |
| S* | B | 287 (0.287) | >1000000 (1000) | — |
| T* | none | 287 (0.287) | 2209 (2.209) | 18599 (18.599) |

*Not an example of the present invention.

Preparation of Cured Composition

A portion of the precatalyzed Resin Formulations from Table VIII was heated at 177° C. for 4 hours (14400 s) to cure the samples. The glass transition temeprature (Tg) of the cured resins was determined by a DuPont model 1090 Differential Scanning Calorimeter (DSC). The results are given in Table IX.

TABLE IX

| EXAMPLE OR COMP. EXPT. | GLASS TRANSITION TEMPERATURE OF CURED RESINS CATALYST TYPE | Tg, °C. |
|---|---|---|
| 20 | 2 | 135.4 |
| S* | B | 137.8 |
| T* | none | 111.2 |

*Not an example of the present invention.

EXAMPLE 22

Epoxy Resin A, 180.8 grams (1.0 equiv.), Extender Compound A, 136.0 grams (0.50 equiv) and 4.3 grams (0.1 equiv.) of curing agent A were heated with stirring under a nitrogen atmosphere at 120° C. until the melt viscosity measured at 100° C. had increased from about 80 cps to 200 cps, an increase in melt viscosity of 150 percent. Then 0.19 ml of Stabilizer A was added. After 5 minutes (300 s) stirring, the homogeneous mixture was cooled to 70° C., 2.16 ml of Catalyst 2 added and the resin cooled to ambient temperature.

EXAMPLE 23

A portion (714.8 grams) of the resin from Example 22 was mixed at 130° C. with 47.0 grams (0.76 equiv.) of Curing Agent B until homogeneous, then cured for 4 hours (14400 s) at 150° C. followed by 3 hours (10800 s) at 200° C. The cured casting had a glass transition temperature of 134.9° C. and a GIC value of 0.61 kJ/m2.

EXAMPLE 24

Epoxy Resin A (1012.5 grams, 5.6 equiv.), 761.6 grams (2.8 equiv.) of Extender A and 24.08 grams (0.56 equiv.) of Curing Agent A were heated with stirring under a nitrogen atmosphere at 120° C. until the melt viscosity measured at 100° C. had inreased from about 80 cps to 200 cps, an increase in melt viscosity of 150 percent. Then 1.06 grams (5.6 mequiv.) of Stabilizer B was added. After 5 minutes (300 s) at 120° C., the homogeneous mixture was cooled to 70° C., 12.1 ml (11.2 mequiv.) of catalyst 2 added and the resin cooled to ambient temperature.

EXAMPLE 25

A portion (731.9 grams) of the resin from Example 24 was mixed at 130° C. with 48.06 grams (0.78 equiv.) of Curing Agent B until homogeneous, then cured for 4 hours (14400 s) at 150° C. followed by 3 hours (10800 s) at 200° C. The cured casting had a glass transition temperature of 137.3° C. and a GIC value of 0.72 kJ/m2.

We claim:

1. A composition which when stored at a temperature of 52° C. for a period of nine weeks exhibits an inrease in viscosity measured in centipoise of less than about 22 percent as compared to the viscosity of the composition prior to storing and wherein the viscosity measurements are taken at room temperature and which composition comprises (A) a material that has an average of more than one vicinal epoxy group per molecule and (B) a catalytic quantity of a catalyst which results from contacting (1) (a) an onium compound represented by the following formula I

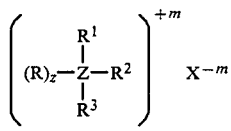

wherein each R, $R^1$, $R^2$ and $R^3$ is independently an aliphatic hydrocarbyl group having from 1 to about 20 carbon atoms or an aliphatic group having from 1 to about 20 carbon atoms which group also contains one or more oxygen, sulfur, halogen or nitrogen atoms, z has a value of zero or 1 depending on the valence of Z; Z is phosphorus, nitrogen or arsenic and each x is the anion portion of an acid of an element selected from carbon or a halogen and m has a value equal to the valence of the anion X or (b) an aliphatic or aromatic tertiary amine with (2) an acid having a weak ncleophilic anion selected from the group consisting of fluoboric acid, fluoarsenic acid, fluoantimonic acid, fluophosphoric acid, chloro-boric acid, chloroarsenic acid, chloroantimonic acid, chlorophosphoric acid, perchloric acid, chloric acid, bromic acid, iodic acid and combinations thereof in an amount which provides from about 0.9 to about 1.5 moles of component (B-2) per mole of component (B-1).

2. A composition of claim 1 wherein each R, $R^1$, $R^2$ and $R^3$ is independently a hydrocarbyl group having from 1 to about 9 carbon atoms and Z is phosphorus or nitrogen.

3. A composition of claim 2 wherein component (B-1-a) is a phosphonium compound, component (B-2) is fluoboric acid and components (B-1) and (B-2) are employed in quantities which provide from about 1 to about 1.4 moles of fluoboric acid per mole of component (B-1).

4. A composition of claim 3 wherein component (B-1) is tetrabutylphosphonium acetateacetic acid complex, triethyl amine, 2-methylimidazole, N-methylmorpholine, N,N,N',N'-tetramethylethylenediamine or a combination thereof.

5. A composition which when stored at a temperature of 52° C. for a period of nine weeks exhibits an increase in viscosity measured in centipoise of less than about 22 percent as compared to the viscosity of the compoisition prior to storing and wherein the viscosity measurements are taken at room temperature and which composition comprises (A) a material that has an average of more than one vicinal epoxy group per molecule and (B) a catalytic quantity of a catalyst represented by the following formula I

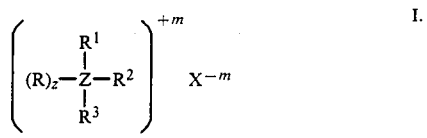

wherein each R, $R^1$, $R^2$ and $R^3$ is independently an aliphatic hydrocarbyl group having from 1 to about 20 carbon atoms or an aliphatic group having from 1 to about 20 carbon atoms which group also contains one or more oxygen, sulfur, halogen or nitrogen atoms; z has a value of zero or 1 depending on the valence of Z; Z is phosphorus or nitrogen; X is fluoborate and m has a value of 1.

6. A composition of claim 5 wherein each R, $R^1$, $R^2$ and $R^3$ is independently a hydrocarbyl group having from 1 to about 9 carbon atoms and Z is phosphorus or nitrogen.

7. A composition of claim 6 wherein Z is phosphorus.

8. A composition of claim 7 wherein R, $R^1$, $R^2$, $R^3$ and Z are such that the onium portion of the catalyst is tetrabutylphosphonium.

9. A composition of claim 1 wherein component (A) is a polyglycidyl ether of a material containing more than one aromatic hydroxyl group per molecule.

10. A composition of claim 9 wherein component (A) is a diglycidyl ether of a bisphenol.

11. A composition of claim 10 wherein component (A) is a diglycidyl ether of a bisphenol.

12. A composition of claim 2 wherein component (A) is a polyglycidyl ether of a material containing more than one aromatic hydroxyl group per molecule.

13. A composition of claim 12 wherein component (A) is a diglycidyl ether of a bisphenol.

14. A composition of claim 13 wherein component (A) is a diglycidyl ether of bisphenol A.

15. A composition of claim 3 wherein component (A) is a polyglycidyl ether of material containing more than one aromatic hydroxyl group per molecule.

16. A composition of claim 15 wherein component (A) is a diglycidyl ether of a bisphenol.

17. A composition of claim 16 wherein component (A) is a diglycidyl ether of bisphenol A.

18. A composition of claim 4 wherein component (A) is a polyglycidyl ether of material containing more than one aromatic hydroxyl group per molecule.

19. A composition of claim 18 wherein component (A) is a diglycidyl ether of a bisphenol.

20. A composition of claim 19 wherein component (A) is a diglycidyl ether of bisphenol A.

21. A composition of claim 5 wherein component (A) is a polyglycidyl ether of material containing more than one aromatic hydroxyl group per molecule.

22. A composition of claim 21 wherein component (A) is a diglycidyl ether of a bisphenol.

23. A composition of claim 22 wherein component (A) is a diglycidyl ether of bisphenol A.

24. A composition of claim 6 wherein component (A) is a polyglycidyl ether of material containing more than one aromatic hydroxyl group per molecule.

25. A composition of claim 24 wherein component (A) is a diglycidyl ether of a bisphenol.

26. A composition of claim 25 wherein component (A) is a diglycidyl ether of bisphenol A.

27. A composition of claim 7 wherein component (A) is a polyglycidyl ether of material containing more than one aromatic hydroxyl group per molecule.

28. A composition of claim 27 wherein component (A) is a diglycidyl ether of a bisphenol.

29. A composition of claim 28 wherein component (A) is a diglycidyl ether of bisphenol A.

30. A composition of claim 8 wherein component (A) is a polyglycidyl ether of material containing more than one aromatic hydroxyl group per molecule.

31. A composition of claim 30 wherein component (A) is a diglycidyl ether of a bisphenol.

32. A composition of claim 31 wherein component (A) is a diglycidyl ether of bisphenol A.

33. A composition of claim 1 which additionally contains (C) a material having an average of more than one phenolic hydroxyl group per molecule.

34. A composition of claim 33 wherein component (C) is bipehnol, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde resin or a combination thereof.

35. A composition of claim 2 which additionally contains (C) a material having an average of more than one phenolic hydroxyl group per molecule.

36. A composition of claim 35 wherein component (C) is biphenyl, bisphenol A, bisphenol K, tetrabomobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

37. A composition of claim 3 which additionally contains (C) a material having an average of more than one phenolic hydroxyl group per molecule.

38. A composition of claim 37 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

39. A composition of claim 4 which additionally contains (C) a material having an average of more than one phenolic hydroxyl group per molecule.

40. A combination of claim 39 wherein component (C) is biphenyl, bisphenol A, bisphenol K, tetrabromobisphenol A, tetrabromobisphenol K, tetramethyltribromobiphenol, phenol-formaldehyde novolac resin, cresol-formaldehyde novolac resin or a combination thereof.

41. A composition of claim 5 which additionally contains (C) a material having an average of more than one phenolic hydroxyl group per molecule.

42. A composition of claim 41 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

43. A composition of claim 6 which additionally contains (C) a materil having an average of more than one phenolic hydroxyl group per molecule.

44. A composition of claim 43 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

45. A composition of claim 7 which additionally contains (C) a material having an average of more than one phenolic hydroxyl group per molecule.

46. A composition of claim 45 wherein component (C) is biphenol, bisphenol A, bisphenol K, tetrabromobisphenol A, tetrabromobisphenol K, tetramethylbiphenol, tetramethyltetrabromobiphenol, etramethyltribromobiphenol, phenol-formaldehyde novolac resin, cresol-formaldehyde novolac resin or a combination thereof.

47. A composition of claim 8 which additionally contains (C) a material having an average of more than one phenolic hydroxyl group per molecule.

48. A composition of claim 47 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

49. A composition of claim 9 which additionally contains (C) a material having an average of more than one phenolic hydroxyl group per molecule.

50. A composition of claim 49 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

51. A composition of claim 10 which additionally contains (C) a material having an average of more than one phenolic hydroxyl group per molecule.

52. A composition of claim 51 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

53. A composition of claim 11 which additionally contains (C) a material having an average of more than one phenolic hydroxyl group per molecule.

54. A composition of claim 53 wherein component (C) is biphenyl, bisphenol A, bisphenol K, tetrabromobisphenol A, tetrabromobisphenol K, tetramethybiphenol, tetramethyltetrabromobiphenol, tetramethyltribromobiphenol, phenol-formaldehyde novolac resin, cresol-formaldehyde novolac resin or a combination thereof.

55. A composition of claim 12 which additionally contains (C) a material having an average of more than one phenolic hydroxyl group per molecule.

56. A composition of claim 55 wherein component (C) is biphenyl, bisphenol A, bisphenol K, tetrabromobisphenol A, tetrabromobisphenol K, tetramethylbiphenol, tetremethyltetrabromobiphenol, tetramethyltribromobiphenol, phenol-formaldehyde novolac resin, cresol-formaldehyde novolac resin or a combination thereof.

57. A composition of claim 13 which additionally contains (C) a material having an average of more than one phenolic hydroxyl group per molecule.

58. A composition of claim 57 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

59. A composition of claim 14 which additionally contains (C) a material having an average of more than one phenolic hydroxyl group per molecule.

60. A composition of claim 59 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

61. A composition of claim 15 which additionally contains (C) a materila having an average of more than one phenolic hydroxyl group per molecule.

62. A composition of claim 61 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

63. A composition of claim 16 which additionally contains (C) a material having an average of more than one phenolic hydroxyl group per molecule.

64. A composition of claim 63 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

65. A composition of claim 17 which additionally contains (C) a material having an average of more than one phenolic hydroxyl group per molecule.

66. A composition of claim 65 wherein component (C) is biphenyl, bisphenol A, bisphenol K, tetrbromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

67. A composition of claim 18 which additionally contains (C) a material having an average of more than one phenolic hydroxyl group per molecule.

68. A composition of claim 67 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde movolac resin, cresol-formaldehyde novolac resin or a combination thereof.

69. A composition of claim 19 which additionally contains (C) a material having an average of more than one phenolic hydroxyl group per molecule.

70. A composition of claim 69 wherein component (C) is biphenyl, bisphenol A, bisphenolK, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

71. A composition of claim 20 which additionally contains (C) a material having an average of more than one phenolic hydroxyl group per molecule.

72. A composition of claim 71 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

73. A composition of claim 21 which additionally contains (C) a material having an average of more than one phenolic hydroxyl group per molecule.

74. A composition of claim 73 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

75. A composition of claim 22 which additionally contains (C) a material having an average of more than one phenolic hydroxyl group per molecule.

76. A composition of claim 75 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

77. A composition of claim 23 which additionally contains (C) a material having an average of more than one phenolic hydroxyl group per molecule.

78. A composition of claim 77 wherein component (C) is biphenyl, bisphenol A, bisphenol K, tetrabromobisphenol A, tetrbromobisphenol K, tetramethylbiphenol, tetramethyltetrabromobiphenol, tetramethyltribromobiphenol, phenol-formaldehyde novolac resin, cresol-formaldehyde novolac resin or a combination thereof.

79. A composition of claim 24 which additionally contains (C) a material having an average of omre than one phenolic hydroxyl group per molecule.

80. A composition of claim 79 wherein component (C) is biphenyl, bisphenol A, bisphenol K, tetrabromobisphenol A, tetrabromobisphenol K, tetramethylbiphenol, tetramehtyltetrabromobiphenol, tetramethyltribromobiphenol, phenol-formaldehyde novolac resin, cresol-formaldehyde novolac resin or a combination thereof.

81. A composition of claim 25 which additionally contains (C) a material having an average of more than one phenolic hydroxyl group per molecule.

82. A composition of claim 81 wherein componet (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

83. A composition of claim 26 which additionally contains (C) a material having an average of more than one phenolic hydroxyl group per molecule.

84. A composition of claim 83 wherein component (C) is biphenyl, bisphenol A, bisphenol K, tetrabromobisphenol A, tetrabromobisphenolK, tetramethylbiphenol, tetramethyltetrabromobiphenol, tetramethyltribromobiphenol, phenol-formaldehyde novolac resin, cresol-formaldehyde novolac resin or a combination thereof.

85. A composition of claim 27 which additionally contains (C) a material having an average of more than one phenolic hydroxyl group per molecule.

86. A composition of claim 85 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

87. A composition of claim 28 which additionally contains (C) a material having an average of more than one phenolic hydroxyl group per molecule.

88. A composition of claim 87 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

89. A composition of claim 29 which additionally contains (C) a material having an average of more than one phenolic hydroxyl group per molecule.

90. A composition of claim 89 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

91. A composition of claim 30 which additionally contains (C) a material having an average of more than one phenolic hydroxyl group per molecule.

92. A composition of claim 91 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

93. A composition of claim 31 which additionally contains (C) a material having an average of more than one phenolic hydroxyl group per molecule.

94. A composition of claim 93 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

95. A composition of claim 32 which additionally contains (C) a material having an average of more than one phenolic hydroxyl group per molecule.

96. A composition of claim 95 wherein component (C) is biphenyl, bisphenol A, bisphenol K, tetrabromobisphenol A, tetrabromobisphenol K, tetramethylbiphenol, tetramethyltetrabromobiphenol, tetramethyltribromobiphenol, phenol-formaldehyde novolac resin, cresol-formaldehyde novolac resin or a combination thereof.

* * * * *

UNITED STATES PATENT AND TRADEMARK OFFICE
CERTIFICATE OF CORRECTION

PATENT NO. : 4,725,652

DATED : February 16, 1988

INVENTOR(S) : James L. Bertram, Louis L. Walker and Van I. W. Stuart

It is certified that error appears in the above-identified patent and that said Letters Patent is hereby corrected as shown below:

Title page, under "Foreign Patent Documents", 3rd line; change "58-138729" to --83-138729--.

Col. 1, line 15; change "inention" to --invention--.

Col. 1, line 23; change "disclsoe" to --disclose--.

Col. 1, line 33; change "stbility" to --stability--.

Col. 1, line 39; change "inrease" to --increase--.

Col. 1, line 41; change "a scom-" to -- as com- --.

Col. 1, line 43; change "viscoisty" to --viscosity--.

Col. 2, line 16; change "cycloaklyl" to --cycloalkyl--.

Col. 2, line 41; change "compund" to --compound--.

Cols. 3 & 4; insert --III-- by the formula between "Formula II" and "Formula IV".

Col. 3, line 63; change "carbn" to --carbon--.

Col. 6, line 64; change "amound" to --amount--.

Col. 6, line 65; change "tyler" to --Tyler--.

Col. 6, line 67; change "tetrabutylphosphnium" to --tetrabutylphosphonium--.

Col. 8, line 17; change 1st occurrence of "A" to --The--.

Col. 8, line 20; change "result" to --results--.

UNITED STATES PATENT AND TRADEMARK OFFICE
CERTIFICATE OF CORRECTION

PATENT NO. : 4,725,652
DATED : February 16, 1988
INVENTOR(S) : James L. Bertram, Louis L. Walker and Van I. W. Stuart It is certified that error appears in the above-identified patent and that said Letters Patent is hereby corrected as shown below:

Col. 9, line 1; change "mnixture" to --mixture--.

Col. 9, line 1; change "as" to --was--.

Col. 9, line 6; change "result" to --results--.

Col. 9, line 16; change "(0." to --(0.11)--.

Col. 10, line 1; change "Recatalyzed" to --Precatalyzed--.

Col. 10, line 5; change "peridically" to --periodically--.

Col. 10, lines 23-24; change "teme- prature" to --temp- erature--.

Col. 10, line 64; change "inreased" to --increased--.

Col. 11, line 13, Claim 1; change "inrease" to --increase--.

Col. 11, line 40, Claim 1; change "ncleo-" to -- nucleo- --.

Col. 11, line 60, Claim 4; change "acetateacetic" to --acetate·acetic--.

Col. 13, line 55, Claim 40; after "K" insert --tetramethylbiphenol, tetramethyltetrabromobiphenol--.

Col. 14, line 2, Claim 43; change "materil" to --material--.

Col. 14, line 17, Claim 46; change "etrame-" to --tetrame- --.

Col. 15, line 24, Claim 61; change "materila" to --material--.

Col. 15, line 60, Claim 68; change "movolac" to --novolac--.

UNITED STATES PATENT AND TRADEMARK OFFICE
CERTIFICATE OF CORRECTION

PATENT NO. : 4,725,652

DATED : February 16, 1988

INVENTOR(S) : James L. Bertram, Louis L. Walker and Van I. W. Stuart

It is certified that error appears in the above-identified patent and that said Letters Patent is hereby corrected as shown below:

Col. 15, line 67, Claim 70; insert a space between "bisphenol" and "K".

Col. 16, line 46, Claim 79; change "omre" to --more--.

Col. 16, line 51, Claim 80; change "tetramehtyltetrabromobiphenol" to --tetramethyltetrabromobiphenol--.

Col. 16, line 59, Claim 82; change "componet" to --component--.

Col. 17, line 3, Claim 84; insert a space between "tetrabromobisphenol" and "K".

Signed and Sealed this

Sixth Day of February, 1990

Attest:

JEFFREY M. SAMUELS

Attesting Officer     Acting Commissioner of Patents and Trademarks